(12) United States Patent
Li et al.

(10) Patent No.: US 8,107,809 B2
(45) Date of Patent: Jan. 31, 2012

(54) CAMERA BELLOWS OF ROTATING-MIRROR FRAMING CAMERA WITHOUT PRINCIPLE ERROR

(75) Inventors: Jingzhen Li, Shenzhen (CN);
Xiangdong Gong, Shenzhen (CN);
Qingyang Wu, Shenzhen (CN)

(73) Assignee: Shenzhen University, Shenzhen, Guangdong (CN)

( * ) Notice: Subject to any disclaimer, the term of this patent is extended or adjusted under 35 U.S.C. 154(b) by 17 days.

(21) Appl. No.: 12/651,385

(22) Filed: Dec. 31, 2009

(65) Prior Publication Data

US 2011/0002683 A1    Jan. 6, 2011

(30) Foreign Application Priority Data

Jul. 6, 2009 (CN) .......................... 2009 1 0108599

(51) Int. Cl.
*G03B 39/06* (2006.01)
(52) U.S. Cl. ......................... 396/335; 352/84
(58) Field of Classification Search .................. 396/335; 352/84
See application file for complete search history.

(56) References Cited

U.S. PATENT DOCUMENTS

| | | | | |
|---|---|---|---|---|
| 2,432,479 A | * | 12/1947 | Lee | 359/825 |
| 5,610,751 A | * | 3/1997 | Sweeney et al. | 359/197.1 |
| 5,923,911 A | * | 7/1999 | Uchiyama et al. | 396/322 |

OTHER PUBLICATIONS

Jungzhen et al (New advanced designing theory on ultra-high speed rotating mirror framing camera. SPIE vol. 4948, 2003. pp. 725-729).*
Igel, Eugene A. Design Calculation for Rotating-Mirror Cameras, Applied Optics vol. 4 No. 9, Sep. 1965, pp. 1169-1175.*
Davis, W.C. Maximizing Exposure-Limited Resolution of Practical Rotating Mirror Cameras, Applied Optics vol. 3 No. 11, Nov. 1964, pp. 1217-1222.*

* cited by examiner

*Primary Examiner* — Clayton E Laballe
*Assistant Examiner* — Leon W. Rhodes
(74) *Attorney, Agent, or Firm* — Global IP Services; Tianhua Gu (57) ABSTRACT

A new camera bellows of a rotating-mirror framing camera, without principle errors such as defocusing error of imaging points, non-uniform photographic frequency and each axial chief ray of exit-pupil and the corresponding relay lens being different with a corresponding reflective optical axis, is provided. This kind of camera bellows is carried out through centers of the exit-pupil diaphragms being disposed on a cylindrical surface aligned with a first Pascal spiral line, and principal points of the relay lenses of the relay lens array and the image recording surface being disposed on cylindrical surfaces aligned with second and third Pascal spiral lines respectively. The bellows is mainly composed of a box, and an aperture diaphragm, a field lens, a rotating mirror, a relay lens array, an exit-pupil diaphragm array and a record image surface.

17 Claims, 3 Drawing Sheets

CAMERA BELLOWS OF ROTATING-MIRROR FRAMING CAMERA WITHOUT PRINCIPLE ERROR

This application claims priority to Chinese Patent Application No. 200910108599.X, filed on Jul. 6, 2009, which is hereby incorporated by reference.

BACKGROUND

1. Field of the Invention

The present invention relates to the technologies of ultra-high speed photography, and more particularly to a camera bellows of a rotating-mirror framing camera without principle error.

2. Description of the Related Technology

A high speed photographic apparatus is an extension of a time resolution capability of a human eye and can record spatiotemporal information within transient processes, thus providing a powerful tool for analyzing and investigating the transient processes. To investigate ultra-fast processes in such fields as detonation, fusion, discharge, high-speed combustion, matter effects of high-power laser acting, non-stable vortex, meso-mechanics or micro-mechanics effects, a high speed photographic apparatus having time resolutions of microsecond and sub-microsecond is generally used. Among various high speed photographic apparatuses that satisfy these above requirements, a rotating-mirror framing camera, which has such characteristics as bigger frame size, higher frame count, higher spatial resolution, and broader framing frequency bandwidth, can handle most of the research tasks that involve ultra-fast processes at an ultra-high framing frequency of $10^4$~$10^7$ fps (frames per second). Therefore, the point of focus in the research field of ultra-high speed photography has the tendency to return back to the rotating-mirror framing camera after transitioning from a rotating mirror model to an image converter tube model and a solid image device model. This framing camera has always been a focal point of research on ultra-high speed photography (SPIE, 2003, Vol. 4948: 330~335; SPIE, 2007, Vol. 6279: 62791U-1~62791U-9).

Figure 1:
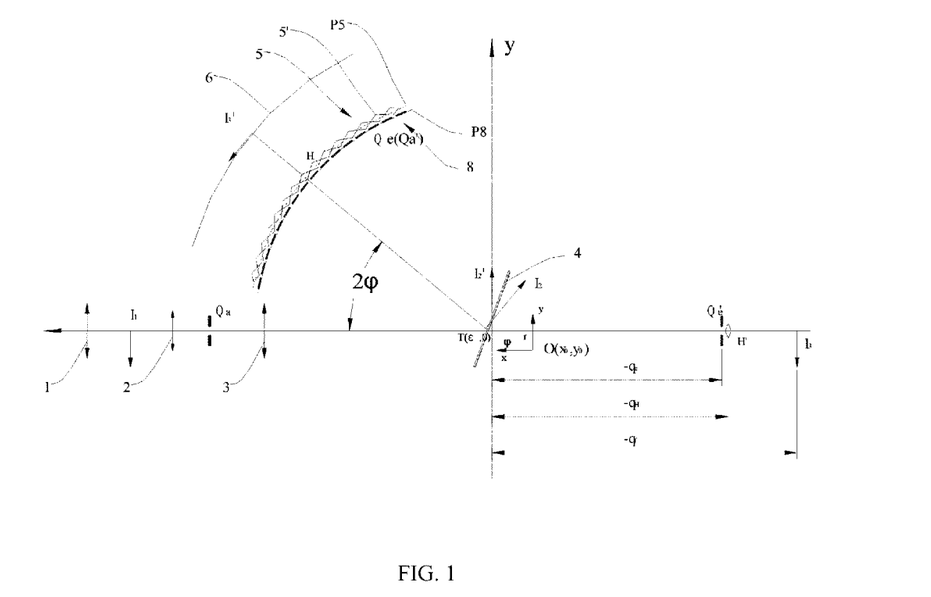
FIG. 1 is a schematic diagram illustrating a principle of a camera bellows of a rotating-mirror framing camera.

The conventional camera bellows of the rotating-mirror framing camera is normally designed based upon the Miller theory. As shown in FIG. 1, a camera bellows of a rotating-mirror framing camera that is built upon the Miller theory generally includes a box, and inside the box, a rotating mirror 4, a relay lens array 5 as well as an image recording surface 6. A primary image $I_1$ that is captured by an object lens 1, which is outside the box, passes through an ocular lens 2 and a field lens 3 to produce a secondary image $I_2$. By adjusting the position of the field lens 3, the secondary image $I_2$ is formed at a certain location that is adjacent to the rotating mirror 4. A mirror image $I_2'$ is formed upon mirroring the secondary image $I_2$ by the rotating mirror 4. Through the relay lens array 5, a final image $I_3'$ of the mirror image $I_2'$ of the secondary image $I_2$ is formed on the image recording surface 6. The mirror image $I_2'$ of the secondary image $I_2$ and the final image $I_3'$ of the image recording surface form an optical conjugate relationship through relevant relay lenses 5'.

To perform exposing and framing functions, an optical shutter is set up in the camera bellows. Specifically, in FIG. 1, an aperture diaphragm Qa is set up between the ocular lens 2 and the field lens 3, and the relay lens array 5 is composed of a plurality of relay lenses 5' which are arranged in an array. Each of the relay lenses 5' has an exit-pupil diaphragm Qe thereon, thus forming an exit-pupil diaphragm array 8. The aperture diaphragm Qa is designed to form an image Qa' on a corresponding exit-pupil diaphragms Qe after passing through the field lens 3, the rotating mirror 4, and a transparent glass spherical cover 12. As the image Qa' of the aperture diaphragm passes upon each exit-pupil diaphragm Qe in sequence by a scan of the rotating mirror 4, each exit-pupil diaphragm Qe is opened accordingly to form an optical shutter for allowing corresponding relay lenses 5' to finally record the final image $I_3'$ of the mirror image $I_2'$ on the image recording surface 6, thus simultaneously achieving the exposing and framing functions.

People have conducted intensive studies relating to a curved surface where relay lenses and exit-pupil diaphragms are located, and an image recording surface for a long time. These two curved surfaces are generally constructed upon the fungible circle designing theory (SPIE Optical Engineering Press, 1997, Rotating Mirror Streak and Framing Cameras; Acta Photonica Sinica, 2004, Vol. 33, No. 6: 739~742).

Since the rotating mirror 4 has a certain half thickness r (that is, the normal distance from the rotating mirror axis to the mirror surface), during a uniform rotary scan of the rotating mirror 4, a reflective point T of a secondary image $I_2$ on the rotating mirror 4 continuously changes in such a way that a trace of an image Qa' of the aperture diaphragm Qa forms a Pascal spiral line. Similarly, the secondary image $I_2$ is mirrored to form a mirror image $I_2'$ which passes through the relay lens to form a final image $I_3'$, a true imaging trace of which is also a Pascal spiral line. As a result, a number of principle errors exist in the rotating-mirror framing camera that is built upon the fungible circle designing theory: (1) Because a curved surface where the relay lens array is located is a fungible-circle curved surface, a defocusing error of imaging points can occur because of inconsistency between this curved surface and the true imaging Pascal spiral line, thus increasing amount of image blur and reducing image resolution. (2) In the above optical shutter, because the trace of the exit-pupil diaphragm array is designed in the form of a fungible circle, a curved surface where the exit-pupil diaphragm array is located cannot be uniformly scanned during a uniform rotation of the rotating mirror, thus causing the framing frequency to become non-uniform. When a large angle is operated, a seriously large time-based identification error may be induced. (3) When designing the curved surface where the relay lenses are located as a fungible circle, a primary ray that passes through a relay lens and its exit-pupil is of a different axis from an optical axis of corresponding reflection, thus leading to an imaging error of the relay lenses and reducing the resolution of the entire camera.

Based on various design needs in existing technology, the above fungible circle design theory can further be divided into defocusing design theory, uniform speed design theory and coaxial design theory respectively targeting the above three deficiencies. However, these design theories can only reduce and minimize a particular principle error. Furthermore, no two design theories can be implemented simultaneously in a same system. Therefore, the above three deficiencies are unavoidable, and a corresponding most preferred design can only be selected according to the specific needs of the system (Acta Photonica Sinica, 2004, Vol. 33, No. 6: 739~742).

BRIEF SUMMARY

Given the deficiencies regarding the non-uniformity of framing frequency that is caused by a failure of scanning an exit-pupil diaphragm array at an uniform speed in a camera bellows of a rotating-mirror framing camera in existing technologies, a technical problem to be solved by the present invention is to provide a camera bellows of a rotating-mirror framing camera which can uniformly scan an exit-pupil diaphragm array during an uniform rotation of a rotating mirror in order to ensure the uniformity of the framing frequency.

A technical scheme adopted in this invention for solving the aforementioned technical problem is to construct a camera bellows of a rotating-mirror framing camera which includes a box, and within the box, a rotating mirror, a relay lens array, an exit-pupil diaphragm array corresponding to the relay lens array, and an image recording surface. A secondary image that is guided from outside the box is formed on the rotating mirror, and subsequently passes through exit-pupil diaphragm and relay lens upon mirroring by the rotating mirror to produce a final image on the image recording surface. The box has an aperture diaphragm configured for controlling the diameter of the imaging beam. An image of the aperture diaphragm is formed on exit-pupil diaphragms of the exit-pupil diaphragm array through the rotating mirror. The centers of each exit-pupil diaphragm of the exit-pupil diaphragm array are placed on a cylindrical surface which is aligned with a first Pascal spiral line.

Preferably, in the camera bellows of the rotating-mirror framing camera of the present invention, a trace equation of the first Pascal spiral line in a planar coordinate system, which plane is perpendicular to a rotating axis of the rotating mirror and which x-axis is in a direction of introducing the secondary image, is as follows:

$$x_e = (q_e + x_0)\cos 2\phi + y_0 \sin 2\phi + (x_0 + 2r \cos \phi)$$

$$y_e = (q_e + x_0)\sin 2\phi - y_0 \cos 2\phi + (y_0 + 2r \sin \phi)$$

where $(x_0, y_0)$ is a coordinate of the center of rotation of the rotating mirror; $(-q_e, 0)$ is a coordinate of an image point of a center of an aperture diaphragm that is imaged by a field lens; $(x_e, y_e)$ is a coordinate of a center of an exit-pupil diaphragm; r is a half thickness of the rotating mirror; and $\phi$ is a real-time angle of the rotating mirror against an initial position in a direction perpendicular to the x axis.

Preferably, in the camera bellows of the rotating-mirror framing camera of the present invention, the image recording surface is positioned on a cylindrical surface which is aligned with a third Pascal spiral line.

Preferably, in the disclosed camera bellows of the rotating-mirror framing camera, a trace equation of the third Pascal spiral line in a planar coordinate system, which plane is perpendicular to a rotating axis of the rotating mirror and which x-axis is in a direction of introducing the secondary image, is as follows:

$$x_f = (q_f + x_0)\cos 2\phi + y_0 \sin 2\phi + (x_0 + 2r \cos \phi)$$

$$y_f = (q_f + x_0)\sin 2\phi - y_0 \cos 2\phi + (y_0 + 2r \sin \phi)$$

where $(x_0, y_0)$ is a coordinate of the center of the rotating mirror; $(-q_f, 0)$ is a coordinate of a center of a design point of the final image, where the designed point of the final image is selected from the optical system without the rotating mirror; $(x_f, y_f)$ is a coordinate of a center of the image recording surface; r is a half thickness of the rotating mirror; and $\phi$ is a real-time angle of the rotating mirror against an initial position in a direction perpendicular to the x axis.

Preferably, in the disclosed camera bellows of the rotating-mirror framing camera, principal points of the relay lenses of the relay lens array are positioned on a cylindrical surface which is aligned with a second Pascal spiral line.

Preferably, in the disclosed camera bellows of the rotating-mirror framing camera, a trace equation of the second Pascal spiral line, where the principal points of the relay lenses are located, in a planar coordinate system which plane is perpendicular to a rotating axis of the rotating mirror and which x-axis is in a direction introducing the secondary image, is as follows:

$$x_H = (q_H + x_0)\cos 2\phi + y_0 \sin 2\phi + (x_0 + 2r \cos \phi)$$

$$y_H = (q_H + x_0)\sin 2\phi - y_0 \cos 2\phi + (y_0 + 2r \sin \phi)$$

where $(x_0, y_0)$ is a coordinate of the center of the rotating mirror; $(-q_H, 0)$ is a coordinate of a design point of the relay lenses. The design point of the relay lenses is the principal point of one of the relay lenses and is determined such that the secondary image directly passes through the relay lenses and focuses the final image at the design point without the rotating mirror; $(x_H, y_H)$ are coordinates of the principal points of the relay lenses; r is a half thickness of the rotating mirror; and $\phi$ is a real-time angle of the rotating mirror against an initial position in a direction perpendicular to the x axis.

Preferably, in the disclosed camera bellows of the rotating-mirror framing camera, when the rotating mirror rotates, the secondary image is reflected by a reflective point of the rotating mirror to a relay lens of the relay lens array. Optical axes of each relay lens are set up in such a way that each optical axis of each relay lens passes through respective reflective points.

Preferably, in the disclosed camera bellows of the rotating-mirror framing camera, the box has a row of lens mounts disposed therein. The row of lens mounts has a plurality of guide slots formed thereon, and each of the guide slots corresponds to each of the relay lenses. The relay lenses are finely movable along respective optical axes of the relay lenses in corresponding guide slots.

Preferably, in the disclosed camera bellows of the rotating-mirror framing camera, the exit-pupil diaphragm array is disposed on an exit-pupil diaphragm piece that is fixed on the inner surface of the row of lens mounts.

Preferably, in the disclosed camera bellows of the rotating-mirror framing camera, the rotating mirror is disposed in a spherical glass housing that is transparent and vacuum therein, with the spherical glass housing being placed inside the box.

The rotating mirror is disposed in a spherical glass housing that is transparent and vacuum therein, with the spherical glass housing being placed inside the box.

The disclosed camera bellows of the rotating-mirror framing camera has the following advantages. By including a box in the camera bellows of the rotating-mirror framing camera and setting up a rotating mirror, a relay lens array, a exit-pupil diaphragm array that corresponds to the relay lens array, and an image recording surface inside the box, a second image that is guided by a lens group including, for example, an object lens, an ocular lens and a field lens from outside passes through the relay lens array upon mirroring by the rotating mirror to form an image on the image recording surface. An aperture diaphragm is disposed in the box for controlling diameter of imaging light beam. The aperture diaphragm is set to be an optical conjugate to exit-pupil diaphragms, such that an image of the aperture diaphragm and the exit-pupil diaphragms together forms an optical shutter to perform the exposing and framing functions on the image recording surface. Since the rotating mirror has a certain thickness, the direction of an incident light beam remains unchanged during a uniform rotary scan of the rotating mirror, but a reflective point of the incident light-beam on the rotating mirror continues to change accordingly, and a trace of a conjugate image point of the aperture diaphragm on the exit-pupil diaphragms becomes a Pascal spiral line. By setting the centers of each exit-pupil diaphragm of the exit-pupil diaphragm array on a cylindrical surface which is aligned with the first Pascal spiral line, each exit-pupil diaphragm is located on the conjugate image point so that a curved surface where the exit-pupil diaphragm array is located coincides with the true trace of the conjugate image point. Therefore, the exit-pupil diaphragm array can be uniformly scanned when the rotating mirror uniformly rotates, ensuring the uniformity of the framing frequency and improving the accuracy of time identification of the photographic apparatus. This is especially true for reducing time-based identification errors when a large angle is operated.

Furthermore, by placing the image recording surface on a cylindrical surface which is aligned with the third Pascal spiral line, a final image can be accurately focused on the image recording surface to avoid the principle error associated with image-defocusing and improve the resolution of the camera.

Furthermore, principal points of each relay lens of the relay lens array are placed on a cylindrical surface which is aligned with the second Pascal spiral line, thus avoiding the image-defocusing problem that occurs in existing technology which arranges the relay lens array in a fungible circle. Therefore, the image point can be accurately focused on the image recording surface to further improve the resolution when photos are taken. In addition, when the rotating mirror rotates, the secondary image is reflected by reflective points of the rotating mirror to each relay lens of the relay lens array. The optical axes of each relay lens are set up in such a way that each optical axis of each relay lens passes through their respective reflective points. Therefore, each optical axis of the relay lenses coincide with a principal light ray of corresponding reflected light beam, thus avoiding imaging error that is caused by different axes in existing technology, and further improving the resolution when taking photographs.

Furthermore, a row of lens mount may be set up in the box with each of the relay lenses of the relay lens array being placed in corresponding guide slots in the row of lens mount. Therefore, the entire camera bellows becomes more compact. Furthermore, the relay lenses may slide in corresponding guide slots along respective directions towards respective reflective points that correspond to the relay lenses on the rotating mirror, such that each relay lens may be finely movable along a direction corresponding to its optical axis. Therefore, principal points of each relay lens may be conveniently adjusted onto a cylindrical surface which is aligned with the second Pascal spiral line, thus facilitating setup and testing of the entire box. Moreover, two rows of lens mounts may further be placed in the box, and preferably be placed symmetrically (or asymmetrically) on the two sides of the rotating mirror so as to form two optical systems and two photographic recording regions in the box for performing continuous access photographic recording. The continuous access photographic recording is referred to as continuously alternating photographic recording and continuously waiting for recording by the two photographic regions where no strict requirement for an initial triggering time point of an object to be photographed is required and a higher number of frames can be obtained.

The present invention is described in further detail below using accompanying figures and exemplary embodiments.

DETAILED DESCRIPTION

Reference will now be made to the drawings to describe exemplary embodiments of the present camera bellows of the rotating-mirror framing camera in detail. The following description is given by way of example, and not limitation.

As shown in FIG. 1, a camera bellows of a rotating-mirror framing camera based upon the Miller theory includes a box 7, a rotating mirror 4, a relay lens array 5 and an image recording surface 6. The rotating mirror 4, relay lens array 5 and the image recording surface 6 are disposed in the box 7. The relay lens array 5 is composed of a plurality of relay lenses 5' which are arranged to form an array. Each of the relay lenses 5' has an exit-pupil diaphragm Qe formed thereon, such that a plurality of exit-pupil diaphragms Qe is arranged to form an exit-pupil diaphragm array 8. Images captured by a lens group outside the camera bellows enter into the box 7 through an aperture diaphragm Qa located at an entrance of the camera bellows. The lens group may include an object lens 1 configured for forming a primary image, and an ocular lens 2 and a field lens 3 configured for forming a secondary image $I_2$. The aperture diaphragm Qa is configured for controlling size of an imaging light-beam.

A planar coordinate system is established in a plane perpendicular to a rotating center of the rotating mirror, and the planar coordinate system includes an x axis along a direction of introducing the secondary image $I_2$. A coordinate of the rotating center 0 of the rotating mirror 4 is $(x_0, y_0)$, and a radius of an inscribed circle of the rotating mirror 4 is a half thickness r of the rotating mirror. A reflective surface of the rotating mirror 4 is in an initial location of the rotating mirror 4 when the reflective surface is perpendicular to the x axis. After the rotating mirror 4 uniformly rotates for a certain time, the reflective surface rotates for a certain rotating angle φ. The primary image $I_1$ captured by the object lens 1 passes through the ocular lens 2 and the field lens 3 to form the secondary image $I_2$. The secondary image $I_2$ is mirrored by the rotating mirror 4 to form a mirror image $I_2'$ of the secondary image $I_2$. The mirror image $I_2'$ passes through the exit-pupil diaphragms Qe and the corresponding relay lenses 5' to form a final image $I_3'$ on the image recording surface 6. Based upon the theory of the rotating-mirror framing camera, the rotating-mirror framing camera is designed to conform to two principles as follows: (1) An image Qa' of the aperture diaphragm Qa passing through the field lens 3, the rotating mirror and the spherical cover 12 coincides with the exit-pupil diaphragms Qe; and (2) The mirror image $I_2'$ of the secondary image $I_2$ formed adjacent to the mirror surface of the rotating mirror forms an optical conjugate relationship with the final image $I_3'$ that is formed on the image recording surface through the corresponding relay lens. During rotation of the rotating mirror 4, the image Qa' of the aperture diaphragm Qa passes through each of the exit-pupil diaphragms Qe of the exit-pupil diaphragm array in sequence, and each of the exit-pupil diaphragms Qe is opened in sequence for allowing the corresponding relay lens 5' to record the final image $I_3'$ of the mirror image $I_2'$ on the image recording surface 6.

In an exemplary embodiment of the present invention, the camera bellows of the rotating-mirror framing camera of the present invention includes the above structure, and further includes three cylindrical surfaces. The three cylindrical surfaces comprise the image recording surface 6, a cylindrical surface P5 where principal points of the relay lenses of the relay lens array are located, and a cylindrical surface P8 where central points of the exit-pupil diaphragms are located. The three cylindrical surfaces are all set up as cylindrical surfaces aligned with Pascal spiral lines respectively.

In the exemplary embodiment of the present invention, an incident light-beam L along the x axis is reflected at a reflective point T(ϵ, 0) of the mirror surface of the rotating mirror 4 to form a principal reflective light L' after passing through the object lens 1, the ocular lens 2 and the field lens 3. Based upon the reflection law, a transformation equation of the mirror surface of the rotating-mirror framing camera is:

$$x'=(x-x_0)\cos 2\phi-(y-y_0)\sin 2\phi+(x_0+2r\cos\phi)$$

$$y'=(x-x_0)\sin 2\phi+(y-y_0)\cos 2\phi+(y_0+2r\sin\phi) \quad (1)$$

where (x, y) is a coordinate of an object point, (x', y') is a coordinate of a conjugate image point of the object point, formed by the mirror surface of the rotating mirror 4 reflecting the object point. When the rotating mirror uniformly rotates, coordinates of the reflective point T at different moments are different, and real-timing rotating angles ϕ of the rotating mirror at different moment are also different. As shown in FIG. 1, incident light-beams $L_1$ and $L_2$ at different moment are reflected by the rotating mirror to form two principal reflective light-beams $L_1'$ and $L_2'$ with different directions. The two principal reflective light-beams $L_1'$ and $L_2'$ pass through different exit-pupil diaphragms of the exit-pupil diaphragm array and different relay lenses of the relay lens array to focus images on the image recording surface. Therefore, the coordinate of the conjugate image point is a continuously-altering high-order curved line. In this exemplary embodiment, since the incident light L is always introduced along the x axis, and the reflective surface of the rotating mirror is a flat surface, and the rotating mirror has a certain thickness, the actual trace of the conjugate image point should be a Pascal spiral line.

The center points of the exit-pupil diaphragms Qe of the exit-pupil diaphragm array are disposed on the cylindrical surface aligned with a first Pascal spiral line. That is, the cylindrical surface P8 where the center points of the exit-pupil diaphragms are located is a cylindrical surface is aligned with the first Pascal spiral line such that the aperture diaphragm Qa and the corresponding exit-pupil diaphragms Qe form the optical conjugate relationship at any moment.

Figure 2:
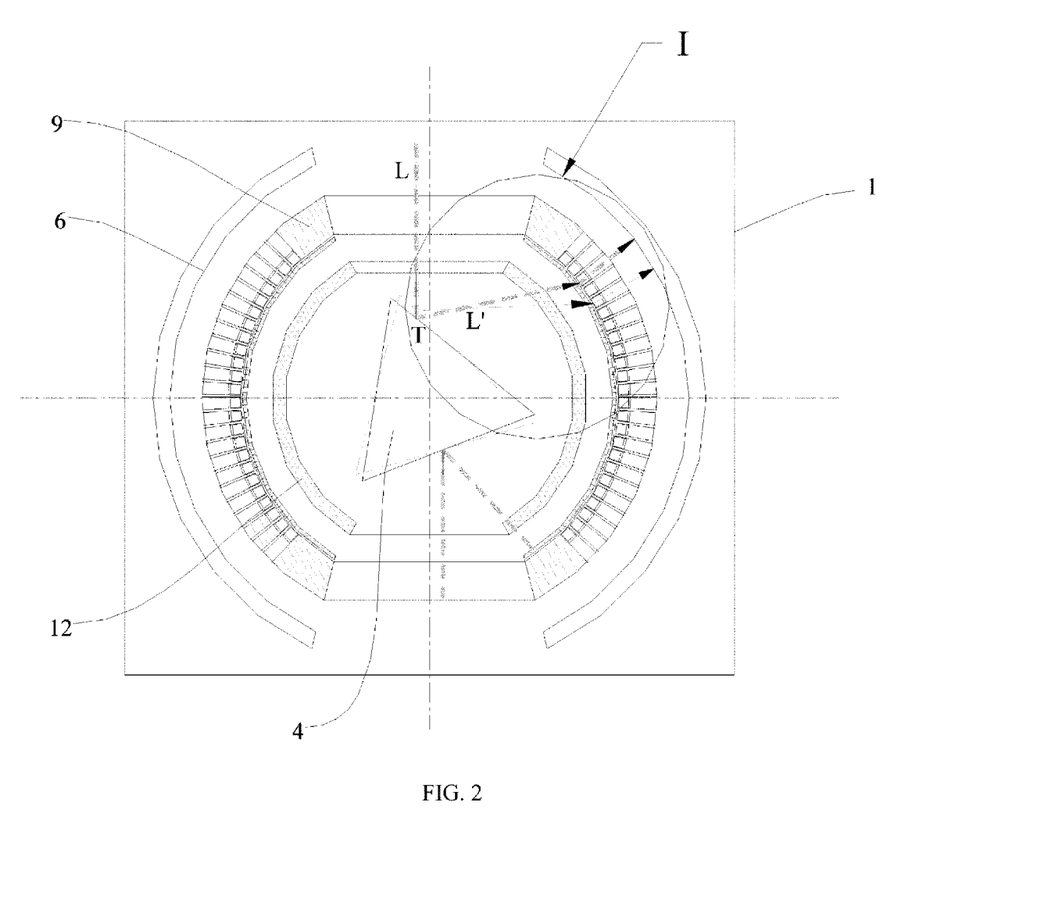
FIG. 2 is a schematic structural diagram illustrating the principle structure of a camera bellows of a rotating-mirror framing camera in accordance with an exemplary embodiment of the present invention.
Figure 3:
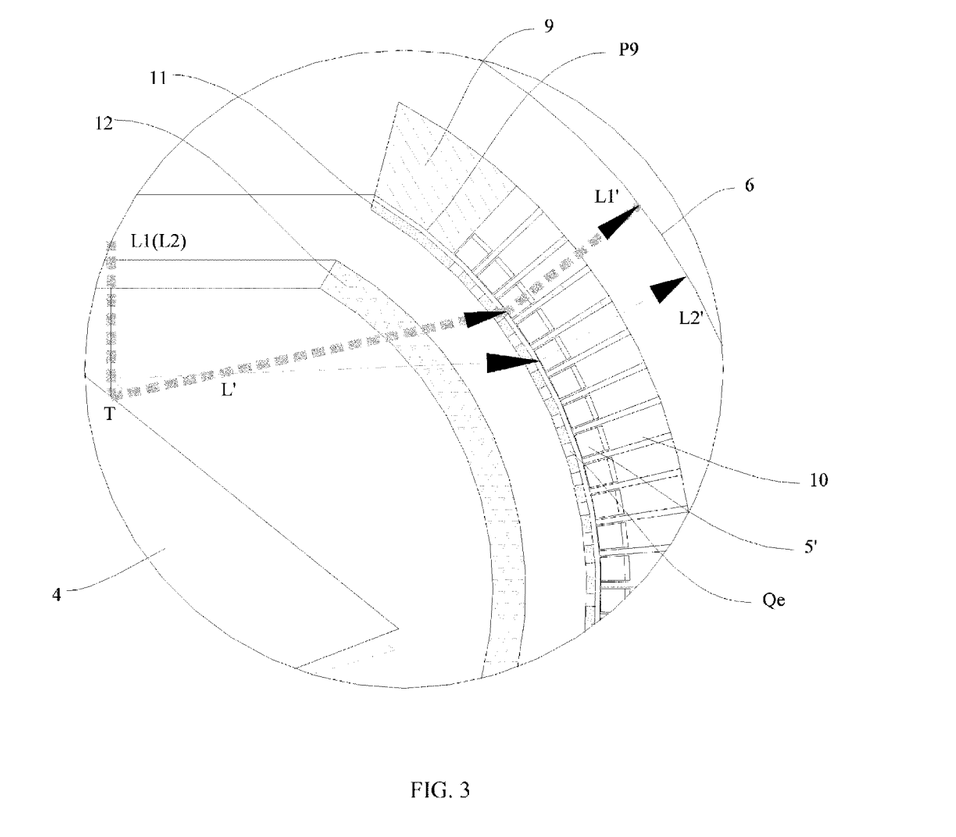
FIG. 3 is a diagram illustrating an enlarged schematic view of Part I of FIG. 2.

As shown in FIGS. 2 and 3, based upon the principle of the rotating-mirror framing camera, when the real-time rotating angle of the rotating mirror is ϕ, the exit-pupil diaphragms Qe and the aperture diaphragm Qa must be disposed to form the optical conjugate relationship by passing through the field lens, the rotating mirror, and the spherical cover. That is, the exit-pupil diaphragms Qe must be located at the location of the image Qa' of the aperture diaphragm. Although the incident light-beam L is always introduced along a same direction, the rotating mirror 4 continuously rotates to continuously scan the image Qa' of the aperture diaphragm. As shown in FIG. 2, (−$q_e$, 0) is the coordinate of the image point of the center point of the exit-pupil diaphragms before it is reflected by the rotating mirror. That is, (−$q_e$, 0) is the coordinate of the image point of the center point of the aperture diaphragm Qa passing through the filed lens. The coordinate of the image point thereof is calculated according to parameters of the optical system composed of the object lens, the ocular lens and the field lens, etc., and a location parameter where the aperture diaphragm is located in the optical system. The coordinate of the image point is introduced into the equation (1), thus a trace equation of the first Pascal spiral line can be achieved as follows:

$$x_e=(q_e+x_0)\cos 2\phi+y_0 \sin 2\phi+(x_0+2r\cos\phi)$$

$$y_e=(q_e+x_0)\sin 2\phi-y_0 \cos 2\phi+(y_0+2r\sin\phi) \quad (2)$$

A center scanning speed of exit-pupil introduced by the rotating mirror rotating is $$V = \frac{ds}{dt},$$

wherein $s^2=x_e^2+y_e^2$. If the rotating angle of the rotating mirror is in the range of ($\phi_0$, $\phi_R$), an average speed is $$\overline{V} = (\varphi_R - \varphi_0)^{-1}\int_{\varphi_0}^{\varphi_R} V d\varphi.$$

To substitute the real-time speed V, coordinates Qe(ϕ) of the center points of the exit-pupil diaphragms scanned in the uniform speed can be achieved according to $$V = \frac{ds}{dt}.$$

Using Qe(ϕ) to substitute Qe in the equation (2), a curved surface where the exit-pupil diaphragms uniformly scanned are located can be determined. The above trace equation can determine the cylindrical surface where the center points of the exit-pupil diaphragms are located, thus achieving uniform scan of the rotating mirror. Therefore, the present invention can ensure the uniformity of the photographic frequency, and improve the read time accuracy of the photographic apparatus. Especially, the present invention can reduce the time-base read error in a large working angle.

As shown in FIGS. 2 and 3, in this exemplary embodiment, the image recording surface 6 is disposed on the cylindrical surface aligned with a third Pascal spiral line. For purpose of convenient calculation, in the planar coordinate system, which plane is perpendicular to a rotating axis of the rotating mirror 4 and which x-axis is in a direction of introducing the secondary image, a design point $I_3$ of the final image is designated in the x axis according to the optical system without the rotating mirror 4. That is, if not for the rotating mirror, the secondary image $I_2$ directly passes through one relay lens of the x axis to focus the image at an image point, or the design point. The image point is located in a range calculated by various parameters of the optical system. A design value is selected based on the size of the box and the magnifying ratio of the relay lenses, etc., to determine a coordinate (−$q_f$, 0) of the design point of the final image. The coordinate is introduced to the equation (1) to obtain a trace equation of the third Pascal spiral line as follows:

$$x_f=(q_f+x_0)\cos 2\phi+y_0 \sin 2\phi+(x_0+2r\cos\phi)$$

$$y_f=(q_f+x_0)\sin 2\phi-y_0 \cos 2\phi+(y_0+2r\sin\phi) \quad (3)$$

where ($x_0$, $y_0$) is a center coordinate of the rotating mirror 4; (−$q_f$, 0) is a coordinate of the design point of the final image; ($x_f$, $y_f$) is a coordinate of the image recording surface 6 actually located in the camera bellows; r is a half thickness of the rotating mirror; and ϕ is a real-time angle of the rotating mirror against an initial position in a direction perpendicular to the x axis. The image recording surface 6 is disposed on the cylindrical surface aligned with the third Pascal spiral line, such that the final image $I_3'$ can be accurately located on the image recording surface 6. Thus, the invention can avoid the image-defocusing principle error, and improve the resolution of the camera.

As shown in FIGS. 2 and 3, the secondary image $I_2$ is reflected to one of the relay lenses 5' of the relay lens array at the reflective point T of the rotating mirror. When the rotating mirror 4 rotates, the location of the reflective point T on the rotating mirror continuously alters, and the corresponding reflective angle thereof also continuously alters, such that the reflective light L' only passes through one of the relay lenses 5' of the relay lens array at different moments. That is, each relay lens has a corresponding reflective point on the rotating mirror thereof. In this exemplary embodiment, an optical axis of each of the relay lenses 5' preferably passes through a corresponding reflective point T thereof, such that the optical axis of each of the relay lenses 5' coincides with a principal light L' of the corresponding reflective light. So, the present invention can avoid the image error of the conventional technology, and further improve the resolution when taking the photography.

As shown in FIG. 2, in this exemplary embodiment, a principal point H of each of the relay lenses 5' of the relay lenses array is located on a cylindrical surface that is aligned with a second Pascal spiral line. That is, the surface P5 wherein the principal points of the relay lenses is the cylindrical surface aligned with the second Pascal spiral line. For convenient calculation, in the planar coordinate system, the plane of which is perpendicular to the rotating center of the rotating mirror 4 and the x axis of which is in the direction of introducing the secondary image $I_2$, a design point H' of the relay lenses is designed in the x axis and selected by the optical system without rotating mirror. That is, if not for the rotating mirror, the secondary image $I_2$ directly passes through one of the relay lenses located at the design point of the relay lenses to focus the image, and the design point of the relay lenses is designed in order for the final image to be focused at the design point $I_3$. A coordinate $(-q_H, 0)$ of the design point H' of the relay lenses may be achieved according to various parameters of the optical system and a coordinate of the selected design point of the final image. The coordinate thereof can be introduced to the equation (1) to achieve a trace equation of the secondary Pascal spiral line as follows:

$$x_H = (q_H + x_0)\cos 2\phi + y_0 \sin 2\phi + (x_0 + 2r \cos \phi)$$

$$y_H = (q_H + x_0)\sin 2\phi - y_0 \cos 2\phi + (y_0 + 2r \sin \phi)$$

where $(x_H, y_H)$ is a coordinate of the principal points H of the relay lenses actually located in the camera bellows, and $(x_0, y_0)$ is a center coordinate of the rotating mirror. r is a half thickness of the rotating mirror, and $\phi$ is a real-time angle of the rotating mirror against an initial position in a direction perpendicular to the x axis. The principal point H of each of the relay lenses of the relay lens array is disposed on the cylindrical surface aligned with the second Pascal spiral line, such that the mirror image $I_2'$ of the secondary image can be accurately focused on the image recording surface 6 by the relay lenses 5', for further improving the resolution when taking the photographs.

FIGS. 2 and 3 are schematic diagrams of a camera bellows of a rotating-mirror framing camera in accordance with an exemplary embodiment of the present invention respectively. To facilitate assembly, a row of lens mounts 9 may be disposed in the box 7 for holding each of the relay lenses of the relay lens array in the box 7. In particular, the row of lens mounts 9 may have many guide slots 10 thereon, and each of the guide slots 10 corresponds to each of the relay lenses, such that the relay lenses 5' can slide in the corresponding guide slots 10 respectively. The guide slots 10 are disposed towards reflective points T on the rotating mirror 4 corresponding to the relay lenses 5'. That is, each of the guide slots 10 is disposed to coincide with a corresponding principal light ray L' of a reflective light ray to ensure that a principal optical axis of each of the relay lenses coincides with the corresponding principal light ray L' respectively when the relay lenses 5' slide in the guide slots 10. The row of lens mounts 9 further includes fastening devices or fasteners thereon for mounting each of the relay lenses 5' to each of the guide slots 10 and holding the relay lenses 5' which have been adjusted on the row of lens mounts 9. An exit-pupil diaphragm piece 11 is formed on an inner surface P9 of the row of lens mounts (that is, a surface of a side of the row of lens mounts faces towards the rotating mirror), and the inner surface P9 of the row of lens mounts is a cylindrical surface aligned with the first Pascal spiral line. The exit-pupil diaphragm piece 11 is adhered on the inner surface P9 to ensure the exit-pupil diaphragm array on the exit-pupil diaphragm piece 11 disposed on the cylindrical surface aligned with the first Pascal spiral line to ensure that the rotating mirror uniformly scans.

A transparent glass spherical cover 12 is further disposed at the inner side of the row of lens mounts 9, and the rotating mirror 4 is disposed in the transparent glass spherical cover 12. It is a vacuum in the transparent glass spherical cover 12 such that the air resistance is greatly reduced when the rotating mirror 4 rotates in the transparent glass spherical cover 12. Therefore, it reduces the resistance when the rotating mirror rotates and impact on image quality. The transparent glass spherical cover also can be used as a long focal-length negative lens.

When the camera bellows are assembled, the image recording surface 6, the row of lens mounts 9 are manufactured based upon the rotating center O of the rotating mirror in need, and the exit-pupil diaphragm piece 11 is held on the inner surface P9 of the row of lens mounts. Then, the vacuum transparent glass spherical cover 12 having the rotating mirror 4 therein is disposed in the box 7. The image recording surface 6 is disposed in the box 7 to ensure that the image recording surface 6 disposed on the cylindrical surface is aligned with the third Pascal spiral line. The field lens 6 is adjusted to form the secondary image $I_2$ adjacent to the desired mirror surface of the rotating mirror. Then the row of lens mounts 9 is assembled between the image recording surface 6 and the rotating mirror 4 in the box 7, and the inner surface P9 of the row of lens mounts is processed based upon the rotating center O of the rotating mirror, thus to make the exit-pupil diaphragm piece 11 having the exit-pupil diaphragm array disposed on the cylindrical surface P8 aligned with the first Pascal spiral. The relay lenses 5' are disposed in the corresponding guide slots 10 of the row of lens mounts 9 to form the relay lens array 5. The relay lenses 5' is adjusted to the proper locations of the guide slots 10 such that the principal points H of the relay lenses are located on the cylindrical surface P5 aligned with the second Pascal spiral line. The intermediary image $I_2$ passes through the rotating mirror, the spherical cover and the relay lenses to form the image $I_3'$ on the image recording surface 6. Then the relay lenses 5' are held on the row of lens mounts 9. The whole box 7 is then sealed by a cover to finish the assembly of the entire camera bellows of the rotating mirror framing camera.

In another exemplary embodiment, two rows of lens mounts may be disposed in the box and the two rows of lens mounts are disposed at two sides of the rotating mirror symmetrically (also may be unsymmetrically) to form two optical systems and two photographic record regions in the box for performing an continuous access photographic recording. The continuous access photographic recording is referred to as continuously alternating photographic recording and continuously waiting for recording by the two photographic record regions where no strict requirement for an initial triggering time point of an object to be photographed is required and a higher number of frames can be obtained.

In the exemplary embodiment, in a condition with small relative aperture, the Pascal curved surface of the relay lens array is processed and located adjacent to the principal surface of the relay lenses according to the equation of the conjugate imaging curved surface of the relay lenses. In a condition with large relative aperture, each of the relay lenses may be manufactured to be a small element, and the location of the axis of each of the relay lenses is adjustable in the direction of facing towards the reflective point corresponding to the corresponding relay lens. Thus each of the relay lenses may be adjusted by the relay lenses focusing the image recording surface and the secondary image.

The above description is given by way of example, and not limitation. Given the above disclosure, one skilled in the art could devise variations that are within the scope and spirit of the invention disclosed herein, including configurations ways of the recessed portions and materials and/or designs of the attaching structures. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A camera bellows of a rotating-mirror framing camera, comprising:
   a box;
   a rotating mirror;
   a relay lens array having a plurality of relay lenses;
   an exit-pupil diaphragm array having a plurality of exit-pupil diaphragms, the exit-pupil diaphragm array corresponding to the relay lens array; and
   an image recording surface;
   wherein the rotating mirror, the relay lens array, the exit-pupil diaphragm array and the image recording surface are disposed in the box, a secondary image introduced outside of the box is imaged on the rotating mirror, reflected by the rotating mirror and passes through the exit-pupil diaphragms and the relay lenses to form a final image on the image recording surface, an aperture diaphragm configured for controlling the size of the imaging light-beam is disposed on the box, an image of the aperture diaphragm is formed on the exit-pupil diaphragms of the exit-pupil diaphragm array after being reflected by the rotating mirror, and centers of the exit-pupil diaphragms of the exit-pupil diaphragm array are disposed on a cylindrical surface aligned with a first Pascal spiral line; principal points of the relay lenses of the relay lens array are each disposed on a cylindrical surface aligned with a second Pascal spiral line; a row of lens mounts is disposed in the box, wherein the row of lens mounts has a plurality of guide slots, wherein each of the guide slots corresponds to each of the relay lenses of the relay lens array, and wherein each of the relay lenses is adjustable in a corresponding guide slot along an optical axis of the relay lenses respectively; two rows of lens mounts are disposed in the box and the two rows of lens mounts are disposed at two sides of the rotating mirror to form two optical systems and two photographic record regions in the box for performing an continuous access photographic recording.

2. The camera bellows of the rotating-mirror framing camera as claimed in claim 1, wherein in a planar coordinate system, a plane of which is perpendicular to a rotating axis of the rotating mirror and an x axis of which is in a direction of introducing the secondary image, a trace equation of the first Pascal spiral line is:

$$x_e = (q_e + x_0)\cos 2\phi + y_0 \sin 2\phi + (x_0 + 2r\cos\phi)$$

$$y_e = (q_e + x_0)\sin 2\phi - y_0 \cos 2\phi + (y_0 + 2r\sin\phi)$$

Where $(x_0, y_0)$ is a rotating center coordinate of the rotating mirror; $(-q_e, 0)$ is a coordinate of an image point focused by a center of the aperture diaphragm that being imaged by a field lens; $(x_e, y_e)$ are coordinates of the centers of the exit-pupil diaphragms; r is a half thickness of the rotating mirror; and $\phi$ is a real-time angle of the rotating mirror against an initial position in a direction perpendicular to the x axis.

3. The camera bellows of the rotating-mirror framing camera as claimed in claim 2, wherein principal points of the relay lenses of the relay lens array are all disposed on a cylindrical surface aligned with a second Pascal spiral line.

4. The camera bellows of the rotating-mirror framing camera as claimed in claim 3, wherein in a planar coordinate system, a plane of which is perpendicular to a rotating axis of the rotating mirror and an x axis of which is in a direction of introducing the secondary image, a trace equation of the second Pascal spiral line where the principal points of the relay lenses are located is:

$$x_H = (q_H + x_0)\cos 2\phi + y_0 \sin 2\phi + (x_0 + 2r\cos\phi)$$

$$y_H = (q_H + x_0)\sin 2\phi - y_0 \cos 2\phi + (y_0 + 2r\sin\phi)$$

where $(x_0, y_0)$ is a rotating center coordinate of the rotating mirror; $(-q_H, 0)$ is a coordinate of a design point of the relay lenses, the design point is a principal point of one of the relay lenses determined by the secondary image directly passing through the relay lenses such that the final image is focused at the design point without the rotating mirror; $(x_H, y_H)$ are coordinates of the principal points of the relay lenses; r is a half thickness of the rotating mirror; and $\phi$ is a real-time angle of the rotating mirror against an initial position in a direction perpendicular to the x axis.

5. The camera bellows of the rotating-mirror framing camera as claimed in claim 3, wherein when the rotating mirror rotates, the secondary image is mirrored at a reflective point of the rotating mirror to one of the relay lenses of the relay lens array, and an optical axis of said relay lenses is set as passing through said reflective point thereof.

6. The camera bellows of the rotating-mirror framing camera as claimed in claim 1, wherein the image recording surface is disposed on a cylindrical surface aligned with a third Pascal spiral line.

7. The camera bellows of the rotating-mirror framing camera as claimed in claim 6, wherein in a planar coordinate system, a plane of which is perpendicular to a rotating axis of the rotating mirror and an x axis of which is in a direction of introducing the secondary image, a trace equation of the third Pascal spiral line is:

$$x_f = (q_f + x_0)\cos 2\phi + y_0 \sin 2\phi + (x_0 + 2r\cos\phi)$$

$$y_f = (q_f + x_0)\sin 2\phi - y_0 \cos 2\phi + (y_0 + 2r\sin\phi)$$

where ($x_0$, $y_0$) is a rotating center coordinate of the rotating mirror; ($-q_f$, 0) is a center coordinate of a design point of the final image and selected from an optical system without the rotating mirror; ($x_f$, $y_f$) is a center coordinate of the image recording surface; r is a half thickness of the rotating mirror; and $\phi$ is a real-time angle of the rotating mirror against an initial position in a direction perpendicular to the x axis.

8. The camera bellows of the rotating mirror framing camera as claimed in claim 7, wherein principal points of the relay lenses of the relay lens array are each disposed on a cylindrical surface aligned with a second Pascal spiral line.

9. The camera bellows of the rotating-mirror framing camera as claimed in claim 8, wherein in a planar coordinate system, the plane of which is perpendicular to a rotating axis of the rotating mirror and the x axis of which is in a direction of introducing the secondary image, a trace equation of the second Pascal spiral line where the principal points of the relay lenses are located is:

$$x_H = (q_H + x_0)\cos 2\phi + y_0 \sin 2\phi + (x_0 + 2r\cos\phi)$$

$$y_H = (q_H + x_0)\sin 2\phi - y_0 \sin 2\phi + (y_0 + 2r\sin\phi)$$

where ($x_0$, $y_0$) is a rotating center coordinate of the rotating mirror; ($-q_H$, 0) is a coordinate of a design point of the relay lenses, the design point is a principal point of one of the relay lenses determined by the secondary image directly passing through the relay lenses such that the final image is focused at the design point without the rotating mirror; ($x_H$, $y_H$) are coordinates of the principal points of the relay lenses; r is a half thickness of the rotating mirror; and $\phi$ is a real-time angle of the rotating mirror against an initial location in a direction perpendicular to the x axis.

10. The camera bellows of the rotating-mirror framing camera as claimed in claim 8, wherein when the rotating mirror rotates, the secondary image is mirrored at a reflective point of the rotating mirror to one of the relay lenses of the relay lens array, and an optical axis of said relay lenses is set as passing through said reflective point thereof.

11. The camera bellows of the rotating mirror framing camera as claimed in claim 6, wherein principal points of the relay lenses of the relay lens array are all disposed on a cylindrical surface aligned with a second Pascal spiral line.

12. The camera bellows of the rotating-mirror framing camera as claimed in claim 11, wherein in a planar coordinate system, a plane of which is perpendicular to a rotating axis of the rotating mirror and an x axis of which is in a direction of introducing the secondary image, a trace equation of the second Pascal spiral line where the principal points of the relay lenses are located is:

$$x_H = (q_H + x_0)\cos 2\phi + y_0 \sin 2\phi + (x_0 + 2r\cos\phi)$$

$$y_H = (q_H + x_0)\sin 2\phi - y_0 \cos 2\phi + (y_0 + 2r\sin\phi)$$

where ($x_0$, $y_0$) is a rotating center coordinate of the rotating mirror; ($-q_H$, 0) is a coordinate of a design point of the relay lenses, the design point is a principal point of one of the relay lenses determined by the secondary image directly passing through the relay lenses such that the final image is focused at the design point without the rotating mirror; ($x_H$, $y_H$) are coordinates of the principal points of the relay lenses; r is a half thickness of the rotating mirror; and $\phi$ is a real-time angle of the rotating mirror against an initial location in a direction perpendicular to the x axis.

13. The camera bellows of the rotating-mirror framing camera as claimed in claim 11, wherein when the rotating mirror rotates, the secondary image is mirrored at a reflective point of the rotating mirror to one of the relay lenses of the relay lens array, and an optical axis of said relay lenses is set as passing through said reflective point thereof.

14. The camera bellows of the rotating-mirror framing camera as claimed in claim 1, wherein in a planar coordinate system a plane of which is perpendicular to a rotating axis of the rotating mirror and an x axis of which is in a direction of introducing the secondary image, a trace equation of the second Pascal spiral line where the principal points of the relay lenses are located is:

$$x_H = (q_H + x_0)\cos 2\phi + y_0 \sin 2\phi + (x_0 + 2r\cos\phi)$$

$$y_H = (q_H + x_0)\sin 2\phi - y_0 \cos 2\phi + (y_0 + 2r\sin\phi)$$

wherein ($x_0$, $y_0$) is a rotating center coordinate of the rotating mirror; ($-q_H$, 0) is a coordinate of a design point of the relay lenses, the design point is a principal point of one of the relay lenses determined by the secondary image directly passing through the relay lenses such that a final image is focused at a design point without the rotating mirror; ($x_H$, $y_H$) are coordinates of the principal points of the relay lenses; r is a half thickness of the rotating mirror; and $\phi$ is a real-time angle of the rotating mirror against an initial position in a direction perpendicular to the x axis.

15. The camera bellows of the rotating-mirror framing camera as claimed in claim 1, wherein when the rotating mirror rotates, the secondary image is reflected at a reflective point of the rotating mirror to one of the relay lenses of the relay lens array, and an optical axis of said relay lenses is set as passing through said reflective point thereof.

16. The camera bellows of the rotating-mirror framing camera as claimed in claim 15, wherein the exit-pupil diaphragm array is located on an exit-pupil diaphragm piece, and wherein the exit-pupil diaphragm piece is mounted on an inner surface of the row of lens mounts.

17. The camera bellows of the rotating-mirror framing camera as claimed in claim 1, wherein the rotating mirror is disposed in a vacuum transparent glass spherical cover, and wherein the vacuum transparent glass spherical cover is disposed in the box.

* * * * *